(12) United States Patent
Agneray

(10) Patent No.: US 10,694,423 B2
(45) Date of Patent: Jun. 23, 2020

(54) METHOD FOR RECONSTRUCTING DATA IN A LOW-RATE TRANSMISSION

(71) Applicant: HL2 GROUP, Futuroscope (FR)

(72) Inventor: Florent Agneray, Sanxay (FR)

(73) Assignee: HL2, Chasseneuil (FR)

( * ) Notice: Subject to any disclaimer, the term of this patent is extended or adjusted under 35 U.S.C. 154(b) by 0 days.

(21) Appl. No.: 16/310,344

(22) PCT Filed: Jun. 9, 2017

(86) PCT No.: PCT/EP2017/064198
§ 371 (c)(1),
(2) Date: Dec. 14, 2018

(87) PCT Pub. No.: WO2017/216076
PCT Pub. Date: Dec. 21, 2017

(65) Prior Publication Data
US 2019/0335360 A1    Oct. 31, 2019

(30) Foreign Application Priority Data

Jun. 15, 2016  (FR) ..................................... 16 55526

(51) Int. Cl.
*H04L 12/28* (2006.01)
*H04W 28/06* (2009.01)
(Continued)

(52) U.S. Cl.
CPC ......... *H04W 28/065* (2013.01); *H04L 1/0006* (2013.01); *H04L 47/34* (2013.01)

(58) Field of Classification Search
USPC ....... 370/389, 349, 328, 310, 329, 338, 394, 370/252, 390, 419, 466, 474, 521, 235,
(Continued)

(56) References Cited

U.S. PATENT DOCUMENTS

| | | | | |
|---|---|---|---|---|
| 2002/0080888 A1* | 6/2002 | Shu | ...................... | G06F 11/1076 375/295 |
| 2002/0120874 A1* | 8/2002 | Shu | ...................... | G06F 11/1076 726/26 |
| 2003/0108066 A1* | 6/2003 | Trippe | .................... | H04L 47/10 370/474 |

FOREIGN PATENT DOCUMENTS

| | | | | |
|---|---|---|---|---|
| WO | WO-9904521 A2 * | 1/1999 | ............ | H03M 13/29 |
| WO | WO-2015012645 A1 * | 1/2015 | ............. | H04L 67/06 |

* cited by examiner

*Primary Examiner* — Phuongchau Ba Nguyen
(74) *Attorney, Agent, or Firm* — Lowenstein Sandler LLP

(57) ABSTRACT

The present disclosure relates to a data reconstruction method for reconstructing data sent from at least one connected object to an addressee via a transmission architecture including at least one low-rate network. The method includes encoding the data as messages and dividing each of the messages into segments. Initial segmentation information for each segment is supplied during the dividing of each of the messages. The method further includes encapsulating each segment in a packet associated with a header and routing the packets via base stations in the at least one low-rate network. The method further includes reconstructing each of the messages from the packets received to generate reconstituted messages. The reconstructing is based on the initial segmentation information and is further based on subsequent sequencing validation of sequencing of the one or more intermediate segments. The method further includes transmitting each reconstituted message to the addressee.

13 Claims, 3 Drawing Sheets

Figure 1:
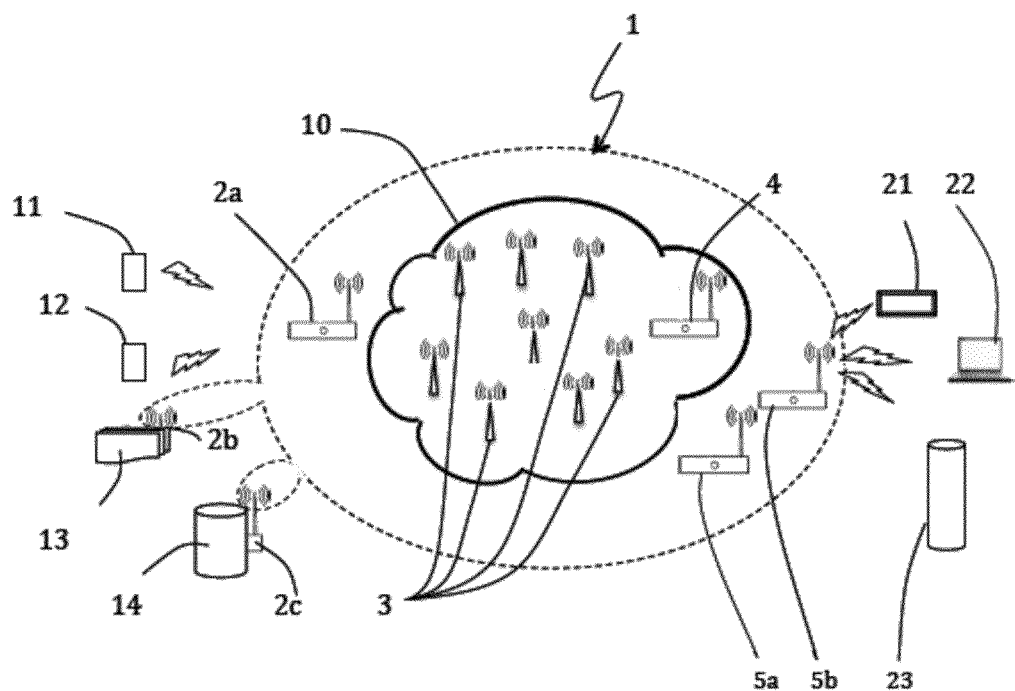

(51) Int. Cl.
*H04L 1/00* (2006.01)
*H04L 12/801* (2013.01)

(58) Field of Classification Search
USPC ....... 370/260, 311, 312, 315, 341, 352, 392, 370/401, 445, 477
See application file for complete search history.

METHOD FOR RECONSTRUCTING DATA IN A LOW-RATE TRANSMISSION

RELATED APPLICATIONS

This Application claims the benefit under 35 U.S.C. § 371 of International Patent Application No. PCT/EP2017/064198, filed Jun. 9, 2017, which claims the benefit of French Application No. 1655526, filed Jun. 15, 2016, which are incorporated by reference in their entirety.

FIELD OF THE INVENTION

The subject matter of the invention is a method for reconstructing data in a low-rate transmission, these data coming from so-called connected objects. The invention relates to the field of the transmission of data and more precisely it relates to the processing of the data sent from such an object connected by transmission means in the more particular domain of radio frequencies.

Transmitting data between so-called connected objects is a branch of telecommunications referred to as IoT (the acronym for Internet of Things). The connected objects relate to any object in the broad sense, equipment or living body, monitored or assessed by a sensor (or a plurality of sensors) connected to means for sending the data supplied by this sensor or sensors and transmitted to receivers. The applications are many and relate to various fields: the environment (temperature, hygrometry, wind speed, gaseous composition, magnetic field, etc.), "intelligent city" equipment (monitoring of flow, public lighting, main energy metering, etc.), health (monitoring of heart rate, blood pressure, body temperature, etc.), home automation and industry (consumption of electricity, fluid levels, detection of fire, intrusions, etc.), or location (children, domestic animals, personal objects, etc.).

This technology of communication between transmitters and receivers has up until now used cellular communication networks such as the GSM network and its derivatives (GPRS, UMTS, LTE, etc.) and/or WiFi networks and/or cable networks (telephone network, specialised or local lines, etc.). However, the transmission rate of IoT transmissions is as a general rule only a few hundreds or a few thousands of bits per day, since the majority of transmissions from connected objects are limited to an isolated sending—for example an alert detecting that a measuring threshold has been exceeded—or a repeated sending, with a low frequency, of state or position data.

It has therefore quickly become apparent that the protocols used—both on cellular networks, such as the LTE or 4G protocol, and on cable networks—have a high energy consumption compared with the low rates of transmissions from connected objects. In order to minimise the electrical consumption of the connected objects and to preserve the life of their energy sources while providing long-distance transmissions (up to a few tens of kilometres), low-rate data transport networks have been developed. These networks, designated by the acronyms LTN (low throughput network) or LPWAN (low power wide area network), use radio-frequency technologies, the hardware and software components of which are designed to minimise energy consumption. They function either in an ultra-narrow bandwidth (UNB) such as the Sigfox® network, or on the contrary by frequency spectrum spreading such as the LoRa® technology, typically on the 868 MHz band in Europe and 915 MHz in the United States.

These LTN/LPWAN transport networks are networks deployed on a local scale (for example on an industrial site) or a global scale (for example on the territory of a country). They consume little energy on transmission (typically 25 mW for the connected objects), and have a very low transmission rate (typically 100 bits/s) and a long range (up to several tens of kilometres in free field). Thus an IoT architecture consisting of LTN/LPWAN networks is particularised by a low rate, low consumption and excellent territorial coverage: for example, the 1500 base stations currently used by the Sigfox® network cover more than 90% of the French territory in outdoor use, and each base station is capable of connecting several hundreds of thousands of objects.

PRIOR ART

With such low-capacity networks, the size of the messages to be transmitted—once the data from the connected objects have been coded in the application layer—is usually incompatible with the low payload size of the packets in the transport network. To enable messages with a greater size than the payload to be transported, it has appeared necessary to divide up the data in the form of segments in the transport layer of the architecture. The segments are numbered and encapsulated with a header containing the service data to form packets. The access layer of the architecture routes the segments over the network.

Examples of IoT architecture are described in the patent documents WO 2011/157938 or WO 2001/58094. In such architectures, the connected objects transmit the packets via accesses to the network, which provides routing to a network controller consisting of one or more control servers dedicated to the delivery of the packets to the addressees.

The packets are transmitted to the addressee, which may be another connected object, an item of equipment or a server. The network controller in particular carries out pre-processing of the packets in order to eliminate duplicates resulting from routing via different base stations. Incomplete segments or ones not recognised by the protocol are deleted. Then the validated packets are transmitted to the addressee, where the segments are formatted in order to extract the data. Under these conditions, the duration of transmission may sometimes be very lengthy, up to several days.

A constraining defect appears when the connected objects are activated and communicate their data at substantially identical instants, causing data peaks. The network controller or the addresses are then overloaded, causing a complication in the management of the data, even in the case of the LTN/LPWAN networks, and this despite their sizing. To remedy this problem, it has been proposed to use a platform comprising essentially an enterprise bus known as ESB (the acronym for enterprise service bus) to serve as an interface between the gateways, the network and the receivers. Such a solution is described for example in the patent documents WO 2015/162225 or US 2012/109663.

However, despite these improvements, the low-rate networks recurrently exhibit uncertainty in the routing of the data which, with regard to the massive increase in the number of objects connected, becomes a major problem. At the same time, the increase in the traffic causes undesirable disturbance effects in the radio-frequency domain, which has the result of reducing the size of the acceptable payload of the packets in the network.

In addition, the authentication of the messages, which requires the addition of an authentication field and the possible enciphering of the messages by block, cause an increase in the size of these messages. This protection causes almost routine exceeding of the size of the payloads imposed by the network.

DISCLOSURE OF THE INVENTION

The problem therefore lies in the fact that it is impossible to transmit messages when the size of the data that they contain and/or their authentification and/or their enciphering cause the acceptable payload of the packets in the network to be exceeded, whereas dividing the message into segments must remain compatible with the size of the packets. In addition, reconstituting the messages requires efficient sequencing to avoid alteration or loss thereof, in whole or in part, or proceeding with erroneous routing, and this over a long period of time that may extend over several days.

The invention proposes to overcome these problems by combining position identification information for each segment in the message division and sequencing of the segments of the message in order to reconstruct this message on arrival. Such a reconstruction of the messages then makes it possible to optimise the intrinsic capacity of the network without loss and with high efficiency.

In this regard, the subject matter of the present invention is more precisely a method for reconstructing data sent from at least one connected object to an addressee via a transmission architecture consisting of at least one low-rate network, access to which is governed by metadata, and comprising the following successive steps of processing said data in bottom transmission layers of the architecture: encoding of the data as messages and initial division of each message into segments positioned according to a first segment followed, where applicable, by a series of intermediate segments, and a last segment; encapsulation of each segment in a packet provided with a header; routeing of the packets via base stations in at least one network in the architecture, and reconstruction of each message from the packets received and then transmission of each reconstituted message to the addressee.

In this method, the reconstruction of each message is based on initial segmentation information on each segment supplied during the division of each message, in coordination with subsequent validation of sequencing of the intermediate segments carried out before transmission to the addressee. The initial segmentation information determines an absence of positioning in the case of a single segment, and positionings of first segment, intermediate segment where applicable and last segment in the case of division into at least two segments. And the subsequent validation of sequencing of the intermediate segments of the messages of more than three segments is composed of a verification of conformity to their initial order and, where applicable, resequencing according to this initial order, from data extracted from the architecture in relation to each transmission of packets.

Under these conditions, the positioning of each segment—as first segment, intermediate segment or last segment—and the order of the intermediate segments are determined without requiring coding these segments with personalised numbering that extends the header of the segment.

According to a preferred embodiment, a validation of desegmentation of messages, carried out as a complement to the sequencing of the intermediate segments for resequencing, is implemented from an integrity check field via a CRC (cyclic redundancy check) tool. This desegmentation validation makes it possible to locate any loss of segment.

According to a particularly advantageous embodiment, the subsequent sequencing validation is carried out using timestamping done on each packet at the entry to the architecture by the connected object, a gateway for access to the network and/or at least one base station. In a variant or in addition to the timestamping on the packets, the sequencing validation is carried out using an extraction of metadata from the bottom layers, such extraction being able to relate to the identifiers of the connected objects associated with parameters relating to the sending of packets and collected by the metadata, supplied for example by a frame counter.

In addition, the segmentation information may be established in accordance with the following advantageous embodiments:

by two positioning bits integrated in the header of the packet of each segment;

by a selection of positioning of the segments from tests on matching between combinations of possible segments using the integrity check field;

the number of segments per message being at least equal to two, the segmentation information is supplied by a bit distinguishing the first segment from the other segments and two periods of specific durations between the sendings of successive packets, a period between the sendings of an intermediate segment and the intermediate segment that follows it in the case of the division of a message into more than three segments, and a period between the sending of one intermediate segment or the single intermediate segment and the sending of the last segment;

the number of segments per message being at least equal to two, the segmentation information is supplied by no more than four sending periods of specific durations, namely a period dedicated to the sending of a last segment in the case of the division of a message into two segments, a first period between the first segment and the first or single intermediate segment in the case of the division of a message into more than two packets, a second period between an intermediate segment and the intermediate segment that follows it in the case of the division of a message into more than three segments, and a third period between an intermediate segment or the single intermediate segment and the last segment in the case of the division of a message into more than two segments.

Advantageously, the invention makes it possible to function with dynamic maximum segment sizes and therefore to optimise the use of the radio-frequency parameters at every instant, which makes it possible to dispense with the traditional approach, which fixes these parameters for transmitting a payload of fixed size. The quality of the transmission and the efficiency are thus substantially improved, the transmission to the addressee being able to be synchronous or asynchronous between the connected object and the network and respectively between the network and the receiver.

According to other advantageous aspects:

after verification that the message to be reconstructed contains more than one segment, each packet in this message is stored for a validity period of given duration;

the reconstitution is carried out by concatenation of the payloads contained in the segments after reconstruction of the message;

the validation of sequencing of the segments and the transmission of the reconstituted messages to the addressees are carried out by at least one segment-processing server, which can be chosen between at least one control server of a network controller and/or at least one validation server of the architecture, independent of the network or networks. In particular, the functions of producing segmentation information and of sequencing validation can be respectively implemented by dedicated segment-processing servers independent of the network or networks.

Advantageously, the invention makes it possible to extend the field of application of the networks for transmissions by timestamped packets with a small bandwidth and low energy consumption by the transmission of more bulky data that is not in principle allowed by the network and/or the transmission of secure data, in a context of low-energy transmission, with very long durability of operations.

PRESENTATION OF THE FIGURES

Figure 2:
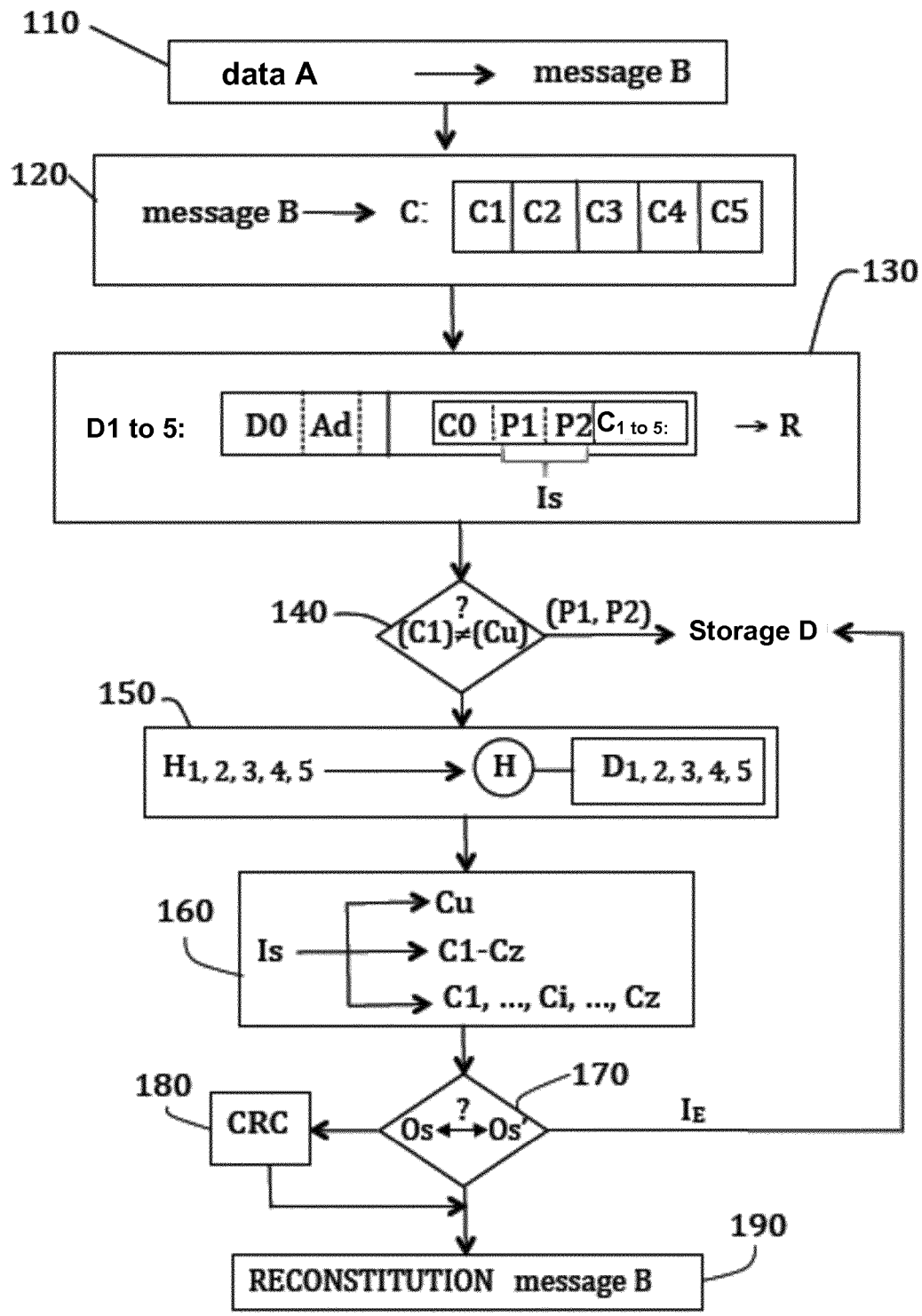
Figure 3:
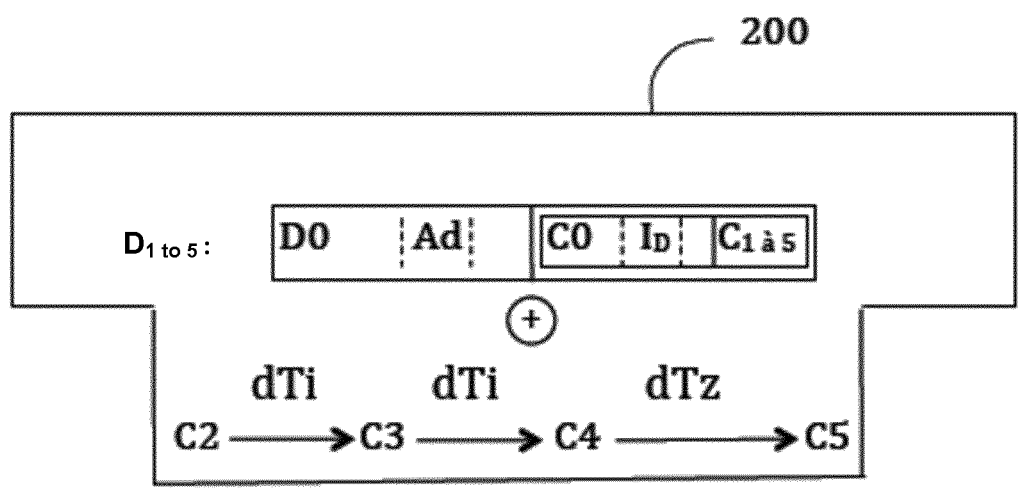
Figure 4:
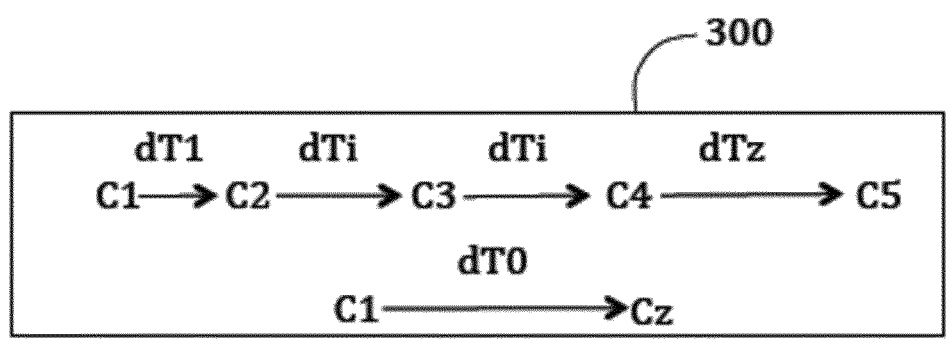

Other features and advantages of the invention will emerge from a reading of the following description, which relates to detailed example embodiments, with reference to the accompanying figures, which show respectively:

FIG. 1, a schematic example of IoT architecture for the radio-frequency transmission of messages according to the invention between a connected object and a receiver via a low-rate network;

FIG. 2, the main steps of reconstruction of a message by the supply of segmentation-information bits and bits for sequencing validation by timestamping in the architecture example in FIG. 1, and FIGS. 3 and 4, diagrams of variants of reconstruction of messages respectively from a distinguishing bit in coordination with two specific time periods for sending segments, and from four specific periods for sending segments.

DETAILED DESCRIPTION OF EXAMPLE EMBODIMENTS

The schematic example of IoT architecture 1, for the radio-frequency transmission of messages according to FIG. 1, comprises a low-rate LTN/LPWAN network 10 using a protocol suited to this type of network. Data are produced periodically or at isolated moments by various items of equipment 11 to 13 with the same structure, a series of electrical consumption readings of groups of buildings in the example, are encoded in the form of messages and are then sent in the form of segments encapsulated in packets—via a connecting gateway 2a or directly by their antenna 2b—to the base stations 3 of the network 10.

Advantageously, a plurality of networks may be used according to the protocol or protocols used. Other data come from a server 14 and are also transmitted directly to the network 10 via its antenna 2c. The base stations 3 of the network 10 cover the space between the sending equipment 11 to 14 and the addressee receivers 21 to 23.

The items of equipment 11 to 14 constitute the connected objects of this example embodiment. They have an internal clock (not shown) so as to be able to transmit at given instants, in accordance with a known precision.

The packets are next conveyed by the network 10 to the respective addressee receivers 21, 22, 23 via the base stations 3 in the network 10, which effect timestamping, detailed below, and transmit the data to a control server 4 of the network 10, which carries out a first elimination of the message duplicates. The addressees are here an invoicing centre 21, database 22 and a recorder 23.

The processing of the data as far as the addressees 21 to 23 is carried out with a protocol used in the bottom layers of the architecture 1 in accordance with steps 110 to 190, in accordance with the example diagram in FIG. 2. In the sending connected objects 11 to 13 or, where applicable, a connecting gateway 2a, any data item or set of data relating to raw information "A" on electrical consumption readings are first of all encoded in the form of messages "B" in the "presentation" layer of the network communication system (encoding step 110). Then each message is divided into segments in the "transport" layer (division step 120), into five segments C1 to C5 in the illustrated example of a message "B".

Each segment "C", C1 to C5, is next encapsulated in a packet, respectively five packets D1 to D5 (encapsulation step 130). In this step 130, each packet "D", D1 to D5, provided with a header D0 containing the address $A_d$ of the equipment connected (added by the bottom connecting layer) is conveyed to the invoicing centre 21, via the stations 3, the control server 4 and, in the example, two validation servers integrated in the architecture 1 independently of the network 10, a so-called segmentation server 5a and a so-called sequencing server 5b (cf. FIG. 1). Each addressee receiver "R", the invoicing centre 21 in the example, is identified by a network application connected to the control server 4.

The position of each segment of the message "B"—in the general case where the message may be a single or multiple segment—is defined using four possibilities: an absence of position as a single segment, a first-segment position C1, an intermediate-segment position Ci (where applicable) and a last-segment position Cz (C5 in the example). These possibilities are covered by segmentation information "Is" implemented, in the example embodiment, by two positioning bits P1 and P2 integrated in the header C0 of each segment "C".

This segmentation information Is is used subsequently by the segmentation server 5a in coordination with a step of validation by sequencing of the intermediate segments Ci of each message "B", which is carried out by the sequencing server 5b.

If the segmentation information Is indicates, by the positioning bits P1, P2, that the first encapsulated segment C1 in the packet D1 is not a single segment Cu, this packet D1 is advantageously stored by the segmentation server 5a (storage block 140), independently of its processing, during a validity period, 24 hours in the example embodiment. Validity periods with a substantially longer duration, potentially very long (for example one year), may be defined if the base stations can be deprived of their connection over such long periods.

In parallel, timestamping of the segments is implemented initially by a base station 3 in the example. Such a station is equipped with a timestamp 2 that then tags a timestamping print "H", H1 to H5 in the example, on each packet D1 to D5 of the message "B" of the example (timestamping step 150). In other example embodiments, the connected object 11 to 14 and/or the connecting gateway 2a are also, or alternatively, equipped with a timestamper.

Before the reconstruction of the messages and transmission thereof to the addressees "R", to the invoicing centre 21 in the example, the segmentation server 5a validates the positioning of the segments "C" (positioning validation step 160) by identifying the segmentation information Is: an absence of positioning for a message with a single segment Cu, an absence of intermediate positioning for a message with two segments C1 and Cz, and the presence of at least one intermediate positioning for a message with at least three segments C1, . . . , Ci, . . . , Cz, such as the five segments C1 to C5 in the example.

The validation of sequencing of the intermediate segments Ci then relates to the verification of sequencing of the intermediate segments Ci for each message "B" of at least three segments and, where applicable, to a resequencing of these segments. This sequencing validation is here controlled at the sequencing server 5b from the segmentation validation provided by the segmentation server 5a (cf. FIG. 1).

More precisely, the segmentation information Is identifies indifferently the intermediate segments Ci of each message, the segments C2 to C4 in the example. The initial sequencing Os of these intermediate segments C2 to C4 is represented by the order of the timestampings H2 to H4 of the packets D2 to D4 received successively by the segmentation server 5a and transmitted to the sequencing server 5b (sequencing-verification step 170). In the event of divergence between the initial sequencing Os defined by the timestampings H2 to H4 and the final sequencing Os' of the intermediate segments C2 to C4, an integrity check on the message makes it possible to validate the desegmentation that results from this divergence and then to re-establish the order of the packets in accordance with the initial time-stamping by a resequencing that takes account of the desegmentation (desegmentation and resequencing step 180).

Thus, in the case of where the segmentation information Is, defined by the bits P1 and P2 of the segments C2 to C4, cannot be correlated with the timestampings Hi of the packets received by the segmentation server 5a, a desegmentation can be validated by checking an integrity field of the message by means of a CRC tool or equivalent. This desegmentation validation, carried out by the "transport" layer of the communication system of the network 10, thus makes it possible to locate any loss of segment.

Such absences of correlation may occur when the number of segments depends on the maximum transmissible size that results from the processing capacity of the bottom layers of the architecture. When a mechanism of automatic retransmission of the segments is integrated in the processing layers, or when the maximum transmissible size is caused to vary for any other reason (redefinition of the architecture, change of network, changes in dynamic radio parameters ADR (acronym for "adaptive data rate") controlled by the control server 4, etc.), the size of the segments is recalculated dynamically, that is to say directly by a dedicated management mechanism, before transmission or (re)sending thereof.

In other cases, the presence of at least two networks may multiply the resending of the packets and the parallel transmission over these networks. In addition, the transmission between the items of connected equipment 11 to 14 and the base stations 3 being synchronous and then asynchronous between the base stations 3 and the control server 4 (cf. FIG. 1), a plurality of segments of various messages are liable to be received almost simultaneously in partial overlap by the control server 4 from one or more base stations 3. An analysis by the CRC tool before the transmission of the message to the addressee 21 advantageously makes it possible to locate such overlaps and where applicable to carry out additional deduplication.

In the case where the desegmentation step (step 180) does not lead to a validation of the desegmentation, an error code $I_E$ is transmitted to the addressee 21, and the segmentation server 5a (see FIG. 1) stores the message sequence according to Os' with this error code. The headers of the segments are next compared with the headers of the other erroneous messages already stored, and along with subsequent storages, in order to be able to subsequently resequence the messages from the erroneous messages.

When a message desegmentation validation leads to the corresponding resequencing (step 180) or when the sequencing Os' is identical to the initial sequencing Os of the intermediate segments (sequencing verification step 170), a reconstitution of the initial message "B" by concatenation of the payloads (step 190) contained in the segments C1 to C5 is finally carried out at the sequencing server 5b in the example, using the segments validated in their segmentation and in their sequencing.

The invention is not limited to the examples described or depicted. Variant implementations of segmentation information by positioning bits and sequencing validation by timestamping of the packets are described below.

In particular, as illustrated by the diagram 200 in FIG. 3, the use of a single bit $I_D$ for distinguishing the first segment C1 from the other segments C2 to C5—integrated in a header C0 of each segment "C"—in combination with a modulation of two periods of sending of the segments are implemented in place of the positioning bits P1 and P2. This solution applies to messages comprising at least two segments: the messages with a single segment Cu are identified by default, that is to say by the absence of segmentation information and by checking the integrity field.

The two sending periods of specific durations dTi and dTz relate respectively to:
  the sending period between two consecutive intermediate segments, the segments C3 and C4 in the example (via the packets D3 and D4) in order to identify the intermediate segments independently of the sending of the first segment C1, and
  the sending period for the first segment (via the packet D4) with reference to the sending of the intermediate segment that precedes it, here C4, which makes it possible to identify C5 as the last segment Cz.

Alternatively, with reference to the diagram 300 in FIG. 4, the segmentation information is implemented by four modulation periods in sending the packets, involving the periods dTi and dTz and two further modulation periods in place of the discrimination bit $I_D$. The packets D (D1 to D5)—containing successively the first segment C1 and then the intermediate segments Ci (C2 to C4) and finally the last segment Cz (C5 in the example)—are sent consecutively in accordance with three sending periods of specific durations:
  the first period dT1 of sending a first intermediate segment C2 (via the packet D2) with reference to the instant of sending of a first segment C1, makes it possible to identify the first two segments;
  the second sending period dTi identifies, as before, the following intermediate segments, here the segments C3 and C4 (via the packet D3 and D4), and
  the third period dTz for sending the last segment (via the packet D4) with reference to the sending of the intermediate segment that precedes it, here C4, makes it possible to identify C5 as the last segment (as before).

Under these conditions, the segment C1 is identified as the first segment, the segments C2 to C4 as intermediate segments and C5 as the last segment in the example illustrated.

Identification of the segments by the modulation of the periods dT1, dTi and dTz does not apply to the messages divided into two segments or into a single segment. In this case, a period dT0 of duration of sending a last segment $C_z$— when its reference instant is the sending of a first segment C1—is defined as the fourth specific modulation period. The segmentation of the messages in two segments is thus directly validated. The messages with a single segment Cu are identified by default and by the integrity check.

Alternatively to the two positioning bits, it is also possible to carry out a series of tests on combinations of segments with the integrity field of the messages as the validation criterion.

Moreover, in a variant or in addition to the timestamping, the sequencing validation and the additional deduplication of the segments are carried out using an extraction of metadata of the bottom layers. Such extraction relates to the identifiers provided by the MAC addresses of the connected objects 11 to 14 associated with a frame counter, or with other parameters: marking of sending of the packets recorded in the metadata or other information elements (delay, interference, modification of payload, etc.) collected by the metadata in connection with the sending of the packets.

Moreover, the steps of reconstitution of the messages from the packets, of segmentation, of sequencing validation and of transmission to the addressees may be implemented by at least one segment-processing server, in particular one or more independent servers, such as the servers 5a and 5b in the example, and/or one or more control servers, such as the server 4 of the controller of the network 10.

Furthermore, it is also possible to use a plurality of low-rate networks in order to distribute the load over a plurality of networks, which makes it possible to improve the efficacy of the transmissions. In this case, the use of one or more independent servers may be particularly useful in order to check the sequencing and segmentation of the messages. This is because the sending or transmission of identical messages resent (causing a multiplication of duplicates), the risks of loss of segments or other disturbances by interference between the transmissions are substantially increased in the case of an architecture covering at least two networks.

The invention claimed is:

1. A data reconstruction method for reconstructing data sent from at least one connected object to an addressee via a transmission architecture comprising at least one low-rate network, wherein access to the at least one low-rate network is governed by metadata, the data reconstruction method comprising:
encoding the data as messages;
dividing each of the messages into a plurality of segments comprising a first segment, one or more intermediate segments, and a last segment, wherein initial segmentation information for each segment of the plurality of segments is supplied during the dividing of each of the messages;
encapsulating each segment in a packet associated with a header to generate a plurality of packets;
routing the plurality of packets via base stations in the at least one low-rate network in the transmission architecture;
reconstructing each of the messages from the plurality of packets received to generate reconstituted messages, wherein the reconstructing is based on the initial segmentation information and is further based on subsequent sequencing validation of sequencing of the one or more intermediate segments; and
transmitting each reconstituted message to the addressee, wherein responsive to a message having a single segment the initial segmentation information indicates an absence of positioning for the single segment, wherein responsive to the message having at least two segments, the initial segmentation information indicates positions of the first segment, the one or more intermediate segments, and the last segment, wherein the subsequent sequencing validation of the one or more intermediate segments of first messages that have more than three segments is composed of a verification of conformity to an initial order, and wherein responsive to the subsequent sequencing validation indicating the plurality of segments do not conform to the initial order, the data reconstruction method further comprises resequencing the one or more intermediate segments according to the initial order based on transmission data extracted from the transmission architecture corresponding to each transmission of the plurality of packets.

2. The data reconstruction method of claim 1, wherein a validation of desegmentation of the messages, carried out for the resequencing of the one or more intermediate segments, is implemented using an integrity check field via a cyclic redundancy (CRC) tool to locate any loss of segment of the plurality of segments.

3. The data reconstruction method of claim 1, wherein the subsequent sequencing validation is carried out by timestamping each packet at entry to the transmission architecture by one or more of the at least one connected object, a gateway for access to the at least one low-rate network, or at least one base station.

4. The data reconstruction method of claim 1, wherein the subsequent sequencing validation is carried out using an extraction of the metadata from bottom transmission layers of the transmission architecture, wherein the extraction corresponds to identifiers of the at least one connected object associated with parameters that correspond to sending of the plurality of packets and that are collected by the metadata.

5. The data reconstruction method of claim 1, wherein the subsequent sequencing validation is carried out by timestamping each packet at entry to the transmission architecture by one or more of the at least one connected object, a gateway for access to the at least one low-rate network, or at least one base station, wherein the subsequent sequencing validation is supplemented by an extraction of the metadata from bottom transmission layers of the transmission architecture, wherein the extraction corresponds to identifiers of the at least one connected object associated with parameters that correspond to sending of the plurality of packets and that are collected by the metadata.

6. The data reconstruction method of claim 1, wherein the initial segmentation information is established by two positioning bits integrated in the header of a corresponding packet of each segment of the plurality of segments.

7. The data reconstruction method of claim 2, wherein the initial segmentation information is established by selecting the positions of the plurality of segments from tests on matching between combinations of possible segments using the integrity check field.

8. The data reconstruction method of claim 1, wherein responsive to number of segments per message being at least equal to two, the initial segmentation information is provided by a bit for distinguishing the first segment from other segments and two periods of specific durations between transmissions of successive packets, wherein a first period is between transmissions of a first intermediate segment and a second intermediate segment that follows the first intermediate segment responsive to division of the message into more than three segments, and wherein a second period is between transmissions of a third intermediate segment and transmission of the last segment.

9. The data reconstruction method of claim 1, wherein responsive to number of segments per message being at least equal to two, the initial segmentation information is provided by four or less sending periods of specific durations, wherein the four or less sending periods comprise one or more of:
- a period dedicated to transmission of the last segment responsive to division of the message into two segments;
- a first period between the first segment and a first intermediate segment responsive to division of the message into more than two packets;
- a second period between a second intermediate segment and a third intermediate segment that follows the second intermediate segment responsive to division of the message into more than three segments; or
- a third period between a fourth intermediate segment and the last segment responsive to division of the message into more than two segments.

10. The data reconstruction method of claim 1, wherein subsequent to verification that the message to be reconstructed contains more than one segment, each packet of the message is to be stored during a validity period of given duration.

11. The data reconstruction method of claim 1, wherein the reconstructing is performed by concatenation of payloads contained in the plurality of segments subsequent to the reconstructing of the message.

12. The data reconstruction method of claim 1, wherein the subsequent sequencing validation of the plurality of segments and the transmitting of each reconstituted message to the addressee are performed by at least one segment-processing server comprising at least one control server of a network controller or at least one validation server of the transmission architecture, independent of the at least one low-rate network.

13. The data reconstruction method of claim 1, wherein producing the initial segmentation information and the subsequent sequencing validation are respectively implemented by dedicated segment-processing servers independent of the at least one low-rate network.

* * * * *